(12) United States Patent
Liu et al.

(10) Patent No.: US 10,082,653 B1
(45) Date of Patent: Sep. 25, 2018

(54) SYSTEMS AND METHODS FOR PERFORMING QUANTITATIVE PHASE-CONTRAST CONFOCAL MICROSCOPY

(71) Applicants: Changgeng Liu, Tampa, FL (US); Myung K. Kim, Tampa, FL (US)

(72) Inventors: Changgeng Liu, Tampa, FL (US); Myung K. Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 595 days.

(21) Appl. No.: 14/751,791

(22) Filed: Jun. 26, 2015

Related U.S. Application Data (60) Provisional application No. 62/017,922, filed on Jun. 27, 2014.

(51) Int. Cl.
*G03H 1/02* (2006.01)
*G02B 21/00* (2006.01)
(Continued)

(52) U.S. Cl.
CPC ....... *G02B 21/0056* (2013.01); *G02B 21/006* (2013.01); *G02B 21/008* (2013.01); *G03H 1/0005* (2013.01); *G03H 1/041* (2013.01); *G03H 1/0465* (2013.01); *G03H 2001/005* (2013.01); *G03H 2001/0469* (2013.01); *G03H 2001/0473* (2013.01)

(58) Field of Classification Search
CPC .............. G02B 21/0056; G02B 21/006; G02B 21/008; G03H 1/0005; G03H 1/041; G03H 1/0465; G03H 2001/005; G03H 2001/0469; G03H 2001/0473

USPC ............................................................ 359/3
See application file for complete search history.

(56) References Cited

U.S. PATENT DOCUMENTS

| 3,013,467 A | 12/1961 | Minsky |
| 5,241,364 A | 8/1993 | Kimura |
| 8,508,746 B2 * | 8/2013 | Wax .................. G01B 9/02057 356/244 |

FOREIGN PATENT DOCUMENTS

| WO | WO97/21129 | 6/1997 |
| WO | WO02/010832 | 7/2002 |

OTHER PUBLICATIONS

Cuche et al (Simultaneous amplitude-contrast and quantitative phase-contrast microscopy by numerical reconstruction of Fresnel off-axis holograms, Applied Optics, vol. 38, No. 34, Dec. 1, 1999, pp. 6994-7001).*

(Continued)

*Primary Examiner* — Stephone B Allen
*Assistant Examiner* — Jyotsna Dabbi
(74) *Attorney, Agent, or Firm* — Thomas | Horstemeyer, LLP (57) ABSTRACT

A system for performing quantitative phase-contrast confocal microscopy includes a light source that emits light, a first beam splitter that splits the emitted light into an illumination path and a hologram path, means provided along the illumination path for delivering a first part of the emitted light to an object as a collimated line, a light sensor that captures light reflected off of the object to obtain an intensity image for the collimated line, and means provided along the hologram path for delivering a second part of the emitted light to the light sensor at an off-axis angle to obtain an off-axis hologram for the collimated line.

13 Claims, 5 Drawing Sheets

(51) Int. Cl.
*G03H 1/00* (2006.01)
*G03H 1/04* (2006.01)

(56) References Cited

OTHER PUBLICATIONS

Kang, et al., "Combined confocal Raman and quantitative phase microscopy system for biomedical diagnosis", BioMedical Optics Express, 2011.
Goy, et al., "Digital Confocal microscopy", Optics Express, 2012.
Im, et al., "Simple high-speed confocal line-scanning microscopy", Optics Express, 2005.
Liu, et al., "Quantitative phase-contrast confocal microscope", Optical Society of America, 2014.
Webb, R.H, "Confocal optical microscopy", Rep. Prog. Phys. 59, 1996.
Im, et al, "Simple high-speed confocal line-scanning microscope", Opt Express, 13, 2005.
Dwyer, et al., "Confocal reflectance theta line scanning microscope for imaging human skin in vivo", Opt. Leff. 31, 2006.
Dwyer, et al., "Confocal thea line scanning microscopy for imaging human tissues", Appl. Opt. 46, 2007.
Cuche, et al., "Digital holography for quantitative phase contrast imaging", Opt. Lett., 24, 199.
Mann, et al., "High resolution quantitative phase contrast microscopy by digital holography", Opt. Express, 13, 2005.
Kim, M.K., Principles and techniques of digital holographic microscopy, SPIE Reviews 1, 2010.
Liu, et al., "Digital holographic adaptive optics for ocular imaging: proof of principle", Opt. Lett. 36, 2011.
Liu, et al., "Fourier transform digital holographic adaptive optics imaging system", Appl. Opt. 51, 2012.
Goy, et al., "Multiple contrast metrics from the measurements of a digital confocal microscope", Biomed Opt. Express 4, 1091-1103, 2013.
Fienup, et al., "Aberration corection by maximizing generalized sharpness metrics", J. Opt. Soc. Am, 2003.
Thurman, et al., "Phase-error correction in digital holography", J. Opt. Soc. Am, 2008.
Wilson, et al., "Size of detector in confocal imaging systems", Opt. Lett, 12, 1987.
Khmaladze, et al., "Phase imaging of cells by simultaneous dual-wavelength reflection digital holography", Opt. Express 16, 2008.
Mujat, et al., "Compact adaptive optics ophthalmoscope", Opt. Express 17, 2009.
Hammer, et al., "Line-scanning laser opthalmoscope", J. Biomed Opt. 11, 2006.

\* cited by examiner

SYSTEMS AND METHODS FOR PERFORMING QUANTITATIVE PHASE-CONTRAST CONFOCAL MICROSCOPY

CROSS-REFERENCE TO RELATED APPLICATION

This application claims priority to U.S. Provisional Application Ser. No. 62/017,922, filed Jun. 27, 2014, which is hereby incorporated by reference herein in its entirety.

NOTICE OF GOVERNMENT-SPONSORED RESEARCH

This invention was made with Government support under grant/contract number R21EY021876, awarded by the National Institutes of Health. The Government has certain rights in the invention.

BACKGROUND

Point-scanning confocal microscopy has proven to be successful for noninvasive imaging of thin sections within thick biological samples with high resolution and contrast. It has also been widely applied in industrial inspection. Unfortunately, the speed at which images are captured using point-scanning is limited. Because of this limitation, line-scanning confocal systems have been proposed that increase the speed with which images can be acquired. Such systems have been successfully tested in industrial inspection, imaging of human tissues, and ophthalmology. Instead of scanning one point in the object at a time, one line is scanned at a time in line-scanning confocal microscopy. In addition to being fundamentally simpler and faster than point scanning, line scanning can produce lateral and axial resolutions that are comparable with those obtained using point-scanning.

Despite these advantages of line-scanning confocal microscopy, it can only be used to capture intensity information and cannot be used to capture the quantitative phase information of the optical field. This is unfortunate as such information is of great interest in industrial inspection and biomedical imaging. For example, because phase information can have much higher contrast than intensity information, phase information can be used to measure very small features of an object, such as its surface roughness. It can therefore be appreciated that it would be desirable to be able to capture both intensity and phase information using line-scanning confocal microscopy.

BRIEF DESCRIPTION OF THE DRAWINGS

The present disclosure may be better understood with reference to the following figures. Matching reference numerals designate corresponding parts throughout the figures, which are not necessarily drawn to scale.

FIGS. 2(a)-2(i) are images that illustrate reconstructions of a confocal intensity image and a confocal phase map. FIG. 2(f) shows a confocal intensity image. FIG. 2(g) shows a corrected phase map.

FIGS. 3(a)-3(c) are graphs that illustrate measurements of lateral and axial resolutions.

FIGS. 4(a)-4(h) are phase images of a phase object by quantitative phase-contrast confocal microscopy (QPCCM) and digital holographic microscopy (DHM). FIG. 4(a) shows a phase map by QPCCM. FIG. 4(d) shows a phase map by DHM.

FIGS. 5(a) and 5(b) are graphs that show the effect of slit width on the phase profile.

FIGS. 6(a)-6(n) are confocal intensity images and phase maps of optical sections of a silicon wafer.

DETAILED DESCRIPTION

As described above, it would be desirable to capture both intensity and phase information using line-scanning confocal microscopy. Disclosed herein are systems and methods that enable this functionality. In some embodiments, a system comprises a light source that emits light that is divided into two paths, including an illumination path and a hologram path. The light along the illumination path is passed through a cylindrical lens to form a line of light that can be focused on an object. The light reflected from the object is captured by a light sensor such that a line of intensity information can be obtained. The light along the hologram path is reflected onto the light sensor at an angle so as to create an off-axis digital hologram so that a line of phase information can be obtained. Multiple scan lines can be captured at different locations of the object to generate a two-dimensional optical section for which both the intensity and phase have been obtained.

In the following disclosure, various specific embodiments are described. It is to be understood that those embodiments are example implementations of the disclosed inventions and that alternative embodiments are possible. All such embodiments are intended to fall within the scope of this disclosure.

Described in this disclosure are systems and methods for performing quantitative phase-contrast confocal microscopy (QPCCM) that can be used to capture high-quality intensity images of optical sections and obtain a quantitative phase map for each optical section at a high speed. The data obtained from such scanning can be easily handled by a conventional desktop computer. As will be apparent from the discussion that follows, potential applications for QPCCM include industrial inspection and biomedical imaging. Because each line scan records all the information of one slice of the object, including the aberrations of the system, QPCCM creates opportunities for a variety of numerical aberration compensation methods and development of full digital adaptive optics systems for biomedical imaging, especially ophthalmic imaging.

Figure 1A:
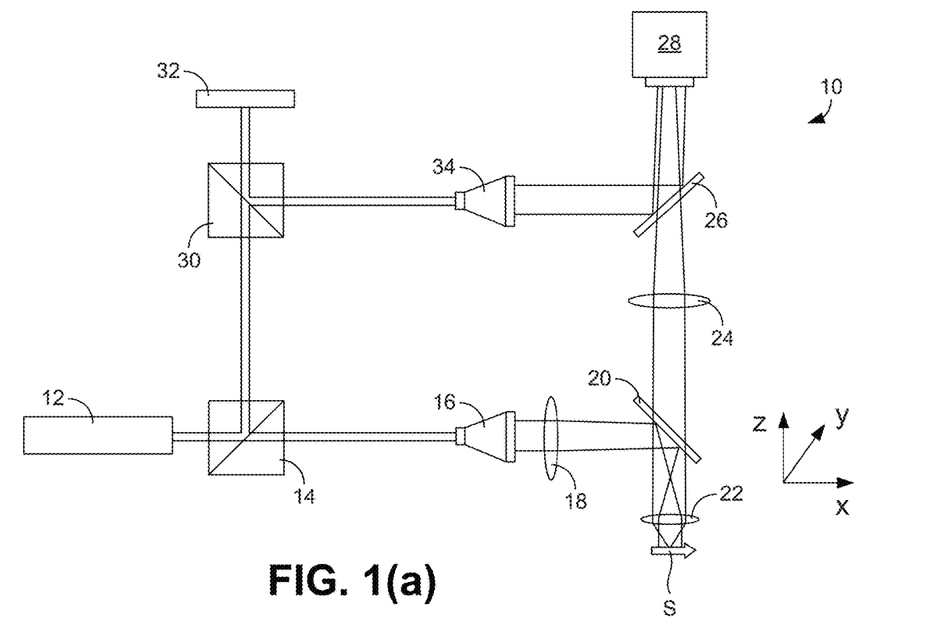
FIG. 1(a) is a schematic diagram of an embodiment of a quantitative phase-contrast confocal microscopy (QPCCM) system.

FIG. 1(a) is a top view of an example embodiment of a QPCCM system 10. In the orientation of the figure, the x-z plane is parallel to the plane of the page and the y direction extends into the page (i.e., along the vertical direction). As shown in this figure, the system 10 includes a light source 12, which can comprise a laser, such as a He—Ne laser. By way of example, the laser can have a wavelength of 632.8 nm.

The light emitted from the light source 12 is directed along the x direction and is divided by a first cubic beam splitter 14 that splits the light into two paths. A first or illumination path continues straight through the beam splitter 14 along the x direction while a second or hologram path extends perpendicularly out from the beam splitter along the z direction.

The light that travels along the illumination path is delivered to a first beam expander 16 that expands and collimates the light. This light then passes through a cylindrical lens 18 that focuses the light onto a line instead of a point as would a conventional lens. By way of example, the cylindrical lens 18 can have a focal length of approximately 75 mm.

After passing through the cylindrical lens 18, the light is reflected by a first pellicle beam splitter 20 to an objective lens 22, which focuses a diffraction-limited focal line at the back focal plane of the lens at which a sample S resides. By way of example, the objective lens 22 has a numerical aperture of 0.65 and 40× power. The sample S lies within the x-y plane such that it is perpendicular to the x-z plane of the page.

Figure 1B:
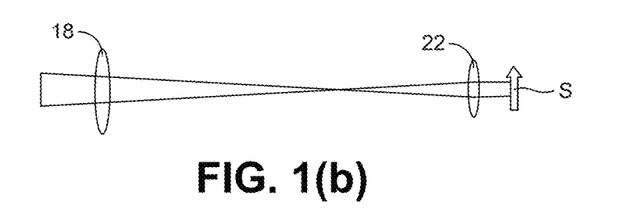
FIG. 1(b) is a view of the illumination provided by the system of FIG. 1 as viewed along the x-z plane
Figure 1C:
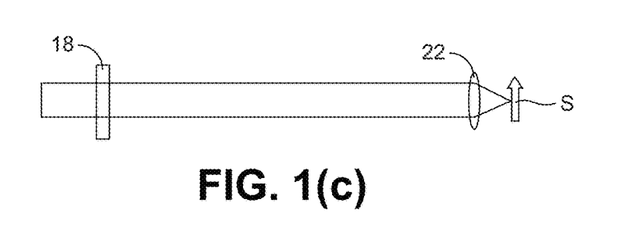
FIG. 1(c) is a view of the illumination provided by the system of FIG. 1 as viewed along the y-z plane.

Accordingly, the sample S is shown in side view in FIG. 1(a). The illumination configuration of the system 10 is unfolded in FIGS. 1(b) and (c). FIG. 1(b) shows the illumination in the x-z plane where the light is focused at the back focal plane of the cylindrical lens 18 and the front focal plane of the objective lens 22 and a collimated line is generated on the sample S in the x direction (horizontally). FIG. 1(c) shows the illumination in the y-z plane.

The light that is reflected from the sample S passes back through the objective lens 22, through the first pellicle beam splitter 20, through a focusing lens 24, through a second, angled pellicle beam splitter 26, and onto a light sensor 28, which captures the intensity information for the collimated line. In some embodiments, the light sensor 28 comprises a charge-coupled device (CCD). By way of example, the light sensor 28 can have 1024×768 square pixels with a side length of 4.65 μm. The light sensor 28 is positioned at the conjugate plane of the sample S. In some embodiments, a smaller area of interest with 512×512 pixels can be used to accelerate data acquisition and processing. By way of example, the calibrated magnification between the light sensor 28 and the object planes can be approximately 43.5.

Also by way of example, the light sensor 28 can be triggered by a data acquisition device at the rate of approximately 20 frames per second (fps).

The part of the light emitted from the light source 12 that is reflected by the first cubic beam splitter 14 along the z direction travels to a second cubic beam splitter 30. This beam splitter 30 also splits the light into two paths with a first path continuing straight through the beam splitter along the z direction and a second path being reflected perpendicularly out from the beam splitter along the x direction (which is discarded). The light of the first path is reflected by a mirror 32 and returns to the beam splitter 30, which reflects the light along the x direction like the second path. The light of the first path therefore travels along the x direction to a second beam expander 34 that expands and collimates the light. This light is then reflected by the second pellicle beam splitter 26 onto the light sensor 28. The second pellicle beam splitter 26 is angled relative to the optical axis of the hologram path such that it is "off axis" and reflects light at an angle relative to the light sensor 28. This generates an off-axis hologram for the collimated line. In some embodiments, the beam splitter 26 is angled approximately 1 to 3 degrees off axis (e.g., approximately 2 degrees off axis), i.e., away from the angle (e.g., 45 degrees) at which it would reflect light in a direction normal to the surface of the light sensor 28. Accordingly, the reflected light is received by the light sensor 28 at an angle that is approximately 1 to 3 degrees (e.g., approximately 2 degrees off axis) away from the normal direction. Notably, the exposure time can be set to be approximately 0.5 ms to remove motion blurring.

At this point, intensity and phase information has been captured for a first line of an optical section and a further line can be scanned. In some embodiments, the sample S can be mounted to a motorized translation stage (not shown) that moves the sample in the y (vertical) direction. In such cases, the sample can be continuously moved in the y direction, for example, at a speed of approximately 2.14 μm/s, during the image acquisition so that further lines of the optical section can be obtained with consistent pixel resolutions in both the scanning and non-scanning directions and satisfying the Nyquist sampling requirement. By way of example, a full-field image of the optical section can be constructed by recording and processing a video of 512 holograms on a conventional computer to reconstruct the intensity and phase images. Further by way of example, the data acquisition can be performed in approximately 26 seconds and the intensity and phase images of an optical section with 512×512 pixels can be reconstructed in approximately two minutes.

Figure 2A:
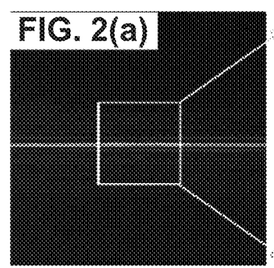
FIG. 2(a) shows a hologram of one line scan.
Figure 2B:
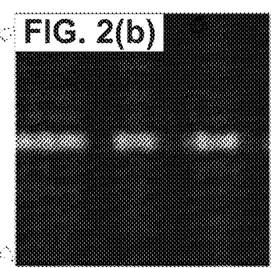
FIG. 2(b) shows a detailed view of the region in the white square in FIG. 1(a).
Figure 2C:
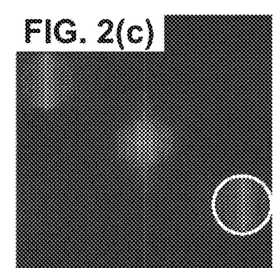
FIG. 2(c) shows the angular spectrum.
Figure 2D:
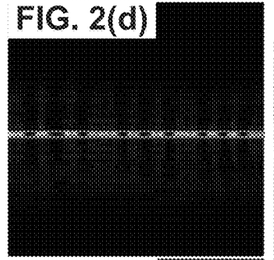
FIG. 2(d) shows the reconstructed intensity of the line scan. The green rectangle represents the numerical slit.
Figure 2E:
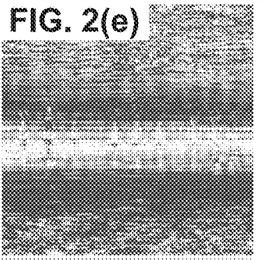
FIG. 2(e) shows the reconstructed phase of the line scan.
Figure 2F:
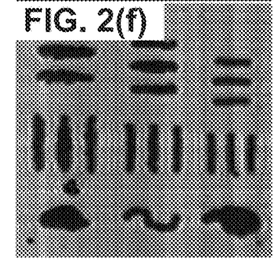
Figure 2G:
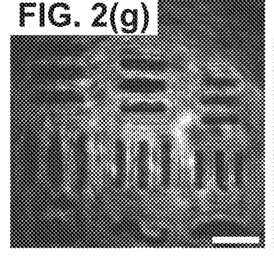
FIG. 2(g) shows a wide-field laser image.

Experiments were performed to demonstrate the basic process of confocal image reconstructions using a system similar to that described above. A negative 1951 United States Air Force (USAF) resolution target was used as the sample. The hologram of one scan is shown in FIG. 2(a). The detailed view of the region in the white square in FIG. 2(a) is shown in FIG. 2(b) where the interference fringes are displayed. The angular spectrum of the hologram in FIG. 2(a) is shown in FIG. 2(c) in a logarithmic intensity scale. The region indicated by the white circle was extracted and used to reconstruct this slice of the sample. The resultant intensity $I_n(x,y)$ and phase map $\Phi_n(x,y)$ are shown in FIGS. 2(d) and (e), respectively, where n indicates the nth scan and the phase map is displayed in a color map (same for all the phase maps in the remainder of this disclosure). The confocal intensity $I_{conf}(x,n)$ of this scan is obtained by summing intensity values of $I_n(x,y)$ within a numerical slit along the y direction, as follows:

$$I_{conf}(x, n) = \sum_{y \in slit} I_n(x, y) \quad (1)$$

where "slit" means the applied numerical slit indicated by the rectangle in FIG. 2(d). The slit width $S_w$ is determined by one diffraction-limited resolution element, which is given by $$S_w = \frac{0.61 \lambda M}{P N.A.} \quad (2)$$

where λ is the wavelength of the light source, M is the magnification of this imaging system, N.A. is the numerical aperture of the microscope objective (MO), and P is the pixel size of the CCD. The result calculated by this equation is 5.55 pixels. $S_w$ was set to be 5 pixels. Slight changes in the slit width had negligible effect on the reconstructions. The full-field confocal intensity image was obtained by stitching together 512 confocal intensity lines given by Equation (1). The reconstructed full-field intensity image is shown in FIG. 2(f). Compared to the wide-field image illustrated in FIG. 2(g), the confocal intensity image clearly has higher contrast and fewer coherent artifacts.

The confocal phase profile $\Phi_{conf}(x,n)$ of each scan is obtained by taking the average of the phase values of $\Phi_n(x,y)$ within the numerical slit along the y direction, as follows:

$$\Phi_{conf}(x, n) = \frac{\sum_{y \in slit} \Phi_n(x, y)}{S_w} \quad (3)$$

Figure 2H:
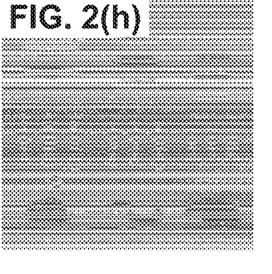
FIG. 2(h) shows a confocal phase map (in radians).
Figure 2I:
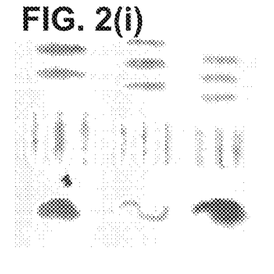

The reconstructed full-field confocal phase map is shown in FIG. 2(h). Random phase shifts among different line holograms due to the mechanical vibrations prevent a two-dimensional phase map from being visualized. These phase shifts can be removed by the following numerical procedures:

Step 1: Subtract the phase values in the nth row from those in the (n−1)th row in a pixel-wise manner;

Step 2: Select the value with the maximum likelihood as the phase shift, correct the nth row by subtracting this phase shift from it, and wrap the result into the range (−π π]; and Step 3: Increase n by one and repeat steps 1 and 2 until the last row. Note that in the first step, the (n−1)th row has already been corrected. The corrected phase map is shown in FIG. 2(i).

Figure 3A:
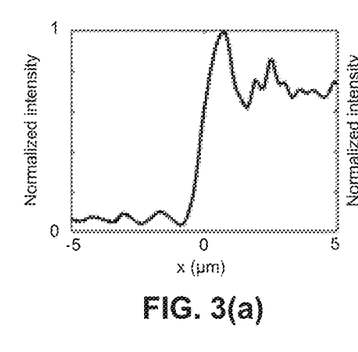
FIG. 3(a) shows the edge spread function in x direction.
Figure 3B:
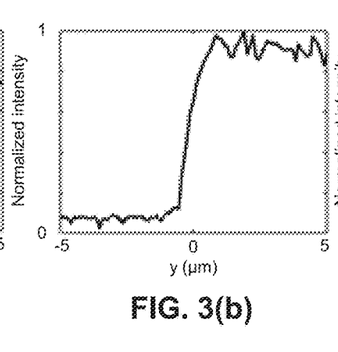
FIG. 3(b) shows the edge spread function in y direction.
Figure 3C:
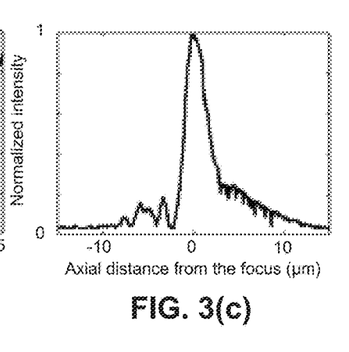
FIG. 3(c) shows the axial response with respect to the axial distance away from the focal plane.

The edge spread functions (ESFs) can be used to test the lateral resolutions. The standard method involves imaging a sharp-edged object. In the experiment, an edge from a Ronchi ruling (20 lp/mm) was imaged. FIG. 3(a) shows the ESF in the non-scanning direction (x direction). The 20%-80% width was used to estimate the lateral resolution in this direction, which was approximately 0.64 μm. The ESF in the scanning direction (y direction) is shown in FIG. 3(b). This curve shows a smoother boundary at the edge than the ESF in the non-scanning direction because of the confocality. The 20%-80% width of this curve is also approximately 0.64 μm. These estimates of the lateral resolutions are close to the diffraction-limited resolution, which is 0.59 μm. This can be verified by the confocal intensity image shown in FIG. 2(f) in which the width of the smallest bar is 2.14 μm. 0.64 μm is a close estimate of the actual resolution. The axial resolution can be tested by measuring the power within the numerical slit of the images of a mirror while it is moved through the focal plane. The axial response with respect to the axial distance away from the focal plane is given by FIG. 3(c). The axial resolution can be estimated by the full width at half maximum (FWHM) of this curve, which is approximately 2.70 μm.

Figure 4A:
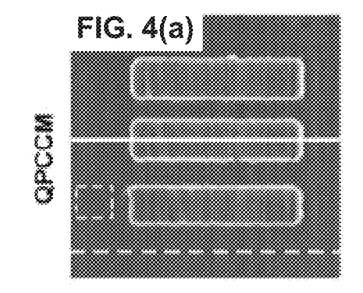
Figure 4B:
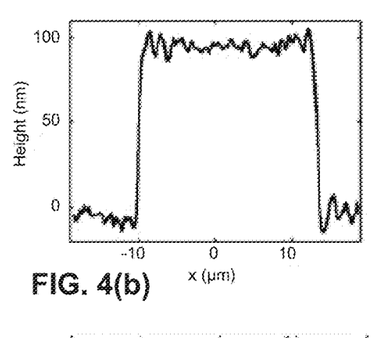
FIG. 4(b) shows a height profile of a cross section by the solid line in FIG. 4(a).
Figure 4C:
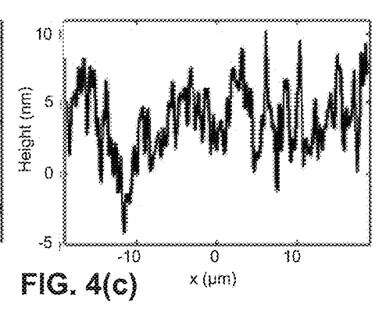
FIG. 4(c) shows a height profile of a cross section by the dashed line in FIG. 4(a).
Figure 4D:
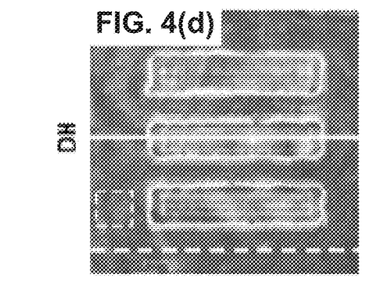
Figure 4E:
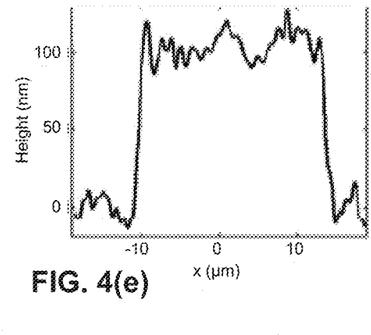
FIG. 4(e) shows a height profile of a cross section indicated by the solid line in FIG. 4(d).
Figure 4F:
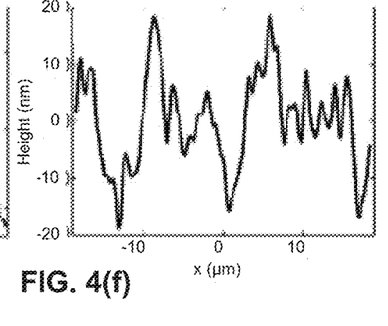
FIG. 4(f) shows a height profile of a cross section indicated by the dashed line in FIG. 4(d).
Figure 4G:
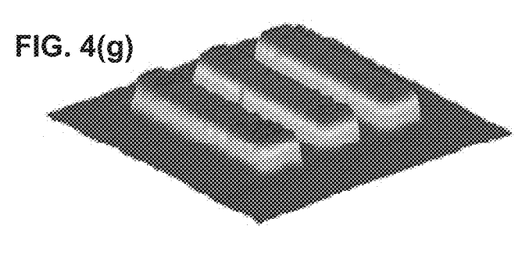
FIG. 4(g) shows a three-dimensional pseudo-color rendering of FIG. 4(a).
Figure 4H:
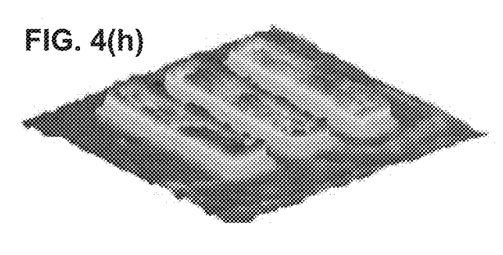
FIG. 4(h) shows a three-dimensional pseudo-color rendering of FIG. 4(d).

A phase object was made by depositing a layer of chrome on top of a positive 1951 USAF resolution target to remove the amplitude contrast. The height of the bars on the target was around 100 nm, which was well within one axial resolution element. Thus, both the top and bottom planes were in focus. The phase map obtained by QPCCM is shown in FIG. 4(a). The height profile at the cross-section indicated by the solid line in FIG. 4(a) is shown in FIG. 4(b). The relationship between the height and the phase is given by $$\text{Height} = \frac{\text{Phase}}{4\pi} \lambda \quad (4)$$

where λ is the wavelength of the laser. The denominator is 4π instead of 2π because the imaging system was in reflection mode. The height of this cross-section was calculated as 100.8 nm. The noise level can be visualized by the height profile of a cross-section through an empty region, as shown in FIG. 4(c), which is the height profile of the cross-section indicated by the dashed line in FIG. 4(a). The noise level is measured by evaluating the standard deviation of a flat region indicated by the dashed square in 4(a), which was calculated as 2.4 nm. The three-dimensional pseudo-color rendering of FIG. 4(a) is shown in FIG. 4(g). For comparison, digital holography was performed on the same area of the target. The phase map obtained by the digital holography is shown in FIG. 4(d). The height profile at the cross-section identified by the solid line in FIG. 4(d) is shown in FIG. 4(e). The height of this cross-section was calculated as 105.0 nm. FIG. 4(f) shows the height profile of the cross-section indicated by the dashed line in FIG. 4(d). Compared to FIG. 4(c), it shows a stronger height variation, which means the noise level of digital holography is worse than the QPCCM. By evaluating the standard deviation of a flat region indicated by the dashed square in FIG. 4(d), the noise level was calculated as 4.8 nm. The three-dimensional pseudo-color rendering of FIG. 4(d) is shown in FIG. 4(h). A more intuitive comparison of the noise levels of FIGS. 4(a) and 4(b) can be given by FIGS. 4(g) and 4(h). It is clear that the phase image of FIG. 4(h) is smoother than that of FIG. 4(g), indicating the noise level of QPCCM is better than digital holography.

The effect of the slit width on the phase profile was investigated by observing how the phase profile of the cross-section in FIG. 4(b) changed as the slit width. The unit of slit width adopted here is in Airy Unit (A.U.), which is given by $$A.U. = \frac{1.22 \lambda}{N.A.} \quad (5)$$

Figure 5A:
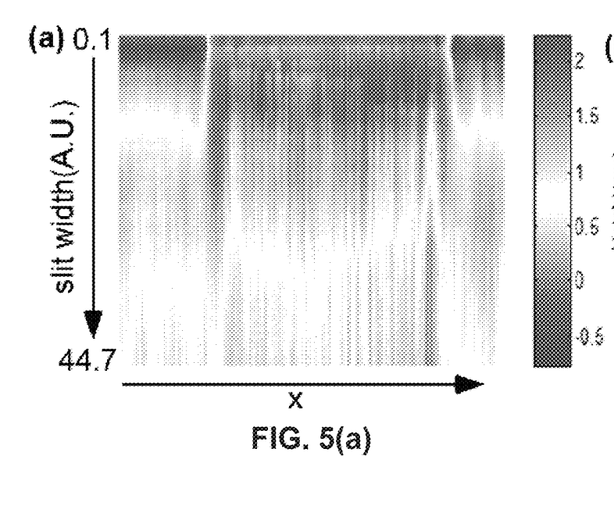
FIG. 5(a) shows the phase profile versus the slit width.
Figure 5B:
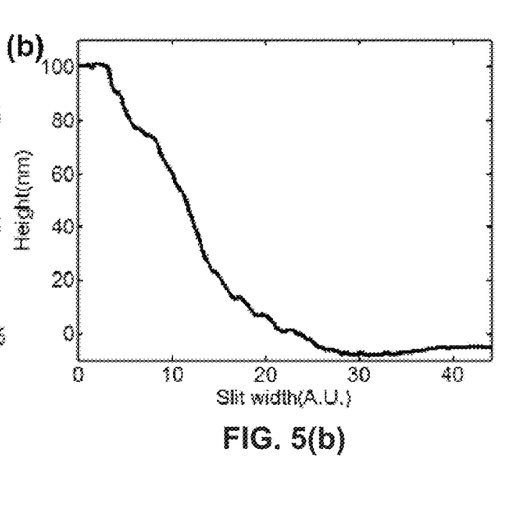
FIG. 5(b) shows the measured height versus the slit width.

A.U. is the diameter of the first dark ring of the Airy pattern. As illustrated by FIG. 5(a), when the slit width is within several A.U., the phase profiles do not change much. After several A.U., the phase profiles begin deviating from the normal phase profiles and finally lose the phase information as the slit width becomes too large. This process can be more clearly monitored by the change in the measured height as the slit width, as shown in FIG. 5(b). When the slit width is within about 2 A.U., the measured height remains nearly the same. After 2 A.U., the measured height begins to decrease and finally becomes meaningless when slit width becomes too large. This observation indicates that the phase map of QPCCM is not sensitive to the slit width when it is within about 2 A.U.

It has been demonstrated above that the intensity image of QPCCM is better than the wide-field coherent image in terms of the contrast and coherent noise. The experimental results indicate that QPCCM can obtain an even better phase map than digital holography. Another important characteristic of QPCCM is its capability of optical sectioning. In fact, its axial resolution has been measured to be approximately 2.70 µm. This capability will now be demonstrated by imaging a silicon wafer at different depths. It will also be demonstrated that the phase maps at different depths can be obtained.

Figure 6A:
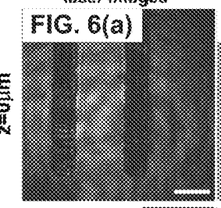
FIGS. 6(a)-6(c) show wide-field images at z=0 µm, 10 µm, and 20 µm.
Figure 6B:
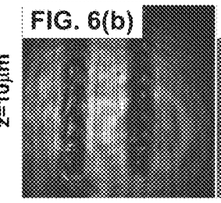
Figure 6C:
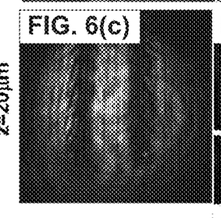
Figure 6D:
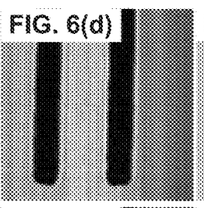
FIGS. 6(d)-(f) show confocal intensity images at z=0 µm, 10 µm, and 20 µm.
Figure 6E:
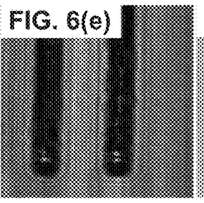
Figure 6F:
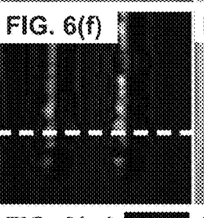
Figure 6G:
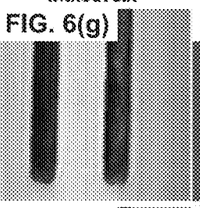
FIGS. 6(g)-(i) show scanning images without numerical slit at z=0 µm, 10 µm, and 20 µm.
Figure 6H:
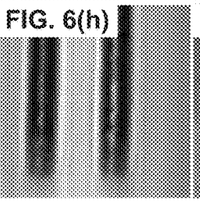
Figure 6I:
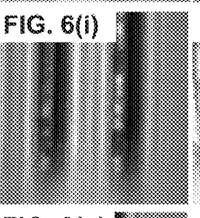
Figure 6J:
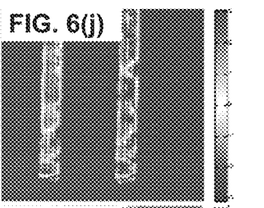
FIGS. 6(j)-(l) show confocal phase maps at z=0 µm, 10 µm, and 20 µm.
Figure 6K:
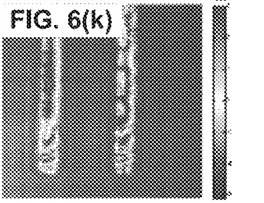
Figure 6L:
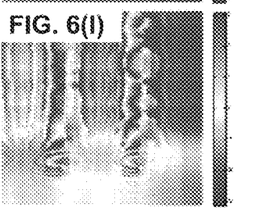
Figure 6M:
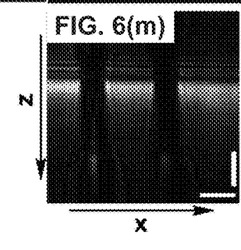
FIG. 6(m) shows a confocal x-z section at the position in x-y plane indicated by the dashed line in FIG. 6(f).
Figure 6N:
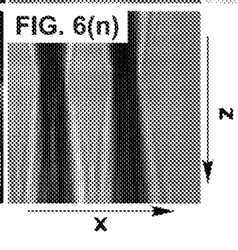
FIG. 6(n) shows a non-confocal counterpart of FIG. 6(m).

A silicon wafer was made by photolithography and the average depth of the patterns was approximately 20.1 µm, which is measured using an optical profiler (Veeco Instruments Inc.). FIGS. 6(a)-6(c) show the wide-field laser images at three different axial distances (depths): z=0 m, 10 µm, and 20.0 µm, respectively. It is apparent that there is no optical sectioning for wide-field imaging. FIGS. 6(d)-6(f) show the confocal intensity images at these three distances by QPCCM. At z=0 µm, the top layer of the silicon wafer is in focus and other parts of the image are dark. At z=10 µm, no apparent plane is in focus. When z is set to be 20 µm, the bottom layer of the etched lines are in focus and other parts of the image are dark. To further demonstrate the optical sectioning, a confocal x-z section at the position indicated by the dashed in FIG. 6(f) is illustrated in FIG. 6(m), where one can discern the bottom and top layers. The depth of the left hole can be measured as approximately 20.7 µm. Similar to the conventional line-scanning confocal microscope, the numerical slit plays a role in enabling the optical sectioning. If the numerical slit is not applied, the capability of optical sectioning will disappear. FIGS. 6(g)-6(i) are the intensity images at the three distances when the numerical slit is removed. One cannot see any characteristics of the optical sectioning. The loss of optical sectioning because of removal of the numerical slit is clearly illustrated in FIG. 6(n), which shows the non-confocal counterpart of FIG. 6(m). In this image, the layered structure is completely lost.

Unlike conventional line-scanning confocal microscopy, QPCCM can be used to obtain the quantitative phase maps of the confocal planes. This characteristic can be illustrated by the confocal phase maps shown in FIGS. 6(j)-6(l). When the top layer of sample is in focus, one can measure the height variation of this focused surface as shown in FIG. 6(j). At z=10 µm, there is no apparent focal plane, therefore, the corresponding phase map shown in FIG. 6(k) is of no practical interest. What is of interest is the phase map of the bottom layer shown in FIG. 6(l), which may reflect irregularity of the etched surfaces. There are two strips in the phase maps that correspond to the bright regions in FIG. 6(f). These two portions of the phase maps provide a quantitative way to assess the height variations of the bottom layer.

The invention claimed is:
1. A system for performing quantitative phase-contrast confocal microscopy, the system comprising:
a light source that emits light;
a first beam splitter that splits the emitted light into an illumination path and a hologram path;
means provided along the illumination path for delivering a first part of the emitted light to an object as a collimated line;
a light sensor that captures light reflected off of the object to obtain an intensity image for the collimated line; and
means provided along the hologram path for delivering a second part of the emitted light to the light sensor at an off-axis angle to obtain an off-axis hologram for the collimated line, wherein the means for delivering a second part of the emitted light comprises a second beam splitter that splits the light into a first path and a second path, the first path including a mirror that reflects the emitted light back to the second beam splitter, a beam expander that receives and collimates the reflected light, and an angled beam splitter that reflects the collimated light at an off-axis angle.
2. The system of claim 1, wherein the light source is a laser.
3. The system of claim 1, wherein the means for delivering a first part of the light comprises a cylindrical lens that focuses the emitted light onto a line.
4. The system of claim 3, wherein the means for delivering a first part of the light further comprises a beam expander that expands and collimates the emitted light prior to the light reaching the cylindrical lens.
5. The system of claim 4, wherein the means for delivering a first part of the light further comprises an objective lens that focuses the collimated line on the object.
6. The system of claim 1, wherein the light sensor is a charge-coupled device.
7. The system of claim 1, further comprising a focusing lens that focuses light reflected by the object onto the light sensor.
8. A system for performing quantitative phase-contrast confocal microscopy, the system comprising:
a laser that emits light;
a first beam splitter that splits the emitted light into two portions;
an illumination path that receives a first portion of the emitted light, the illumination path including a beam expander that receives and collimates the emitted light, a cylindrical lens that receives the collimated light and focuses it onto a line, and an objective lens that focuses the collimated line onto an object;
a hologram path that receives a second portion of the emitted light, the hologram path including a second beam splitter that splits the light into a first path and a second path, the first path including a mirror that reflects the emitted light back to the second beam splitter, and the second path including a beam expander that receives and collimates the reflected light and an angled beam splitter that reflects the collimated light at an off-axis angle; and
a light sensor that captures light reflected off of the object to obtain an intensity image for the collimated line and captures off-axis light from the angled beam splitter to obtain an off-axis hologram for the collimated line.
9. A method for performing quantitative phase-contrast confocal microscopy on an object, the method comprising:
(a) splitting light from a light source along two different paths including an illumination path and a hologram path;
(b) focusing the light along the illumination path onto a portion of the object as a collimated line;
(c) delivering the light along the hologram path to the light sensor at an angle relative to light reflected from the object so as to obtain an off-axis line hologram;

(d) reconstructing a line of intensity information and a line of phase information from the off-axis line hologram by applying a numerical slit to the off-axis line hologram;

(e) refocusing the light along the illumination path as a collimated line onto a different portion of the object and repeating steps (c) and (d) to obtain a further line of intensity information and a further line of phase information;

(f) repeating step (e) until a plurality of lines of intensity information and a plurality of lines of phase information have been obtained;

(g) reconstructing a full-field intensity image for the object by stitching the plurality of lines of intensity information together; and (h) reconstructing a full-field phase image for the object by stitching the plurality of lines of phase information together.

10. The method of claim 9, wherein focusing and refocusing the light comprises passing the light through a cylindrical lens.

11. The method of claim 9, wherein delivering the light along the hologram path comprises delivering the light after it has been reflected by a mirror.

12. The method of claim 9, wherein delivering the light along the hologram path comprises reflecting the light onto the light sensor with an angled beam splitter.

13. The method of claim 9, wherein the width of the numerical slit is no greater than 2 Airy units.

* * * * *